United States Patent [19]
Devanbu et al.

[11] Patent Number: 6,101,603
[45] Date of Patent: Aug. 8, 2000

[54] SYSTEM AND METHOD FOR USING A SECOND RESOURCE TO STORE A DATA ELEMENT FROM A FIRST RESOURCE IN A FIRST-IN LAST-OUT STACK

[75] Inventors: Premkumar Thomas Devanbu, Davis, Calif.; Stuart Gerald Stubblebine, Lebanon, N.J.

[73] Assignee: AT&T Corporation

[21] Appl. No.: 09/022,053

[22] Filed: Feb. 11, 1998

Related U.S. Application Data

[60] Provisional application No. 60/047,246, May 21, 1997.

[51] Int. Cl.[7] .......................................................... H04L 9/00
[52] U.S. Cl. ............................ 713/176; 713/165; 713/187
[58] Field of Search ................................ 380/25; 713/200, 713/201, 176, 181, 187, 156, 178, 165; 707/10; 711/132

[56] References Cited

U.S. PATENT DOCUMENTS

| | | | |
|---|---|---|---|
| 5,001,752 | 3/1991 | Fischer | 380/23 |
| 5,235,642 | 8/1993 | Wobber et al. | 380/25 |
| 5,412,717 | 5/1995 | Fischer | 380/4 |
| 5,568,554 | 10/1996 | Eastlake, 3rd | 380/25 |
| 5,608,800 | 3/1997 | Hoffmann et al. | 380/25 |
| 5,757,919 | 5/1998 | Herbert et al. | 380/25 |
| 5,784,459 | 7/1998 | Devarakonda et al. | 380/4 |

FOREIGN PATENT DOCUMENTS

| | | |
|---|---|---|
| 0402 210 | 12/1990 | France . |
| 0828 218 | 3/1998 | France . |
| WO 98 26537 | 6/1998 | Germany . |
| 0814 398 | 12/1997 | United Kingdom . |
| WO 95 15522 | 6/1995 | WIPO . |

OTHER PUBLICATIONS

Blum et al, "Checking the Correctness of Memories," FOCS 91, Oct. 1992.

Devanbu et al, "Stack and Queue Integrity on Hostile Platforms" Apr. 1998.

Haber et al, "How to Time Stamp a Digital Document," J. Cryptology pp.99–111, 1991.

Scheier, Applied Cryptography, pp.130–133, 1996.

"ECECS 578 Feb. 3, 1998 Lecture Notes," http://oz.uc.edu/~chengy/new578/02–03.html [internet].

Amato et al, "Checking Linked Data Structures," Proc. 24th Internation Symposium of FTCS, 1994.

*Primary Examiner*—Tod R. Swann
*Assistant Examiner*—Stephen Kabakoff
*Attorney, Agent, or Firm*—Kenyon & Kenyon

[57] ABSTRACT

A system and method are provided for using a second resource to store a data element from a first resource in a stack. A data element $X_{N+1}$ and a signature $S[N]$ are signed at a first resource to obtain a signature $S[X_{N+1}, S[N]]$, where N is an integer. The data element $X_{N+1}$ and the signature $S[N]$ are sent from the first resource to the second resource to be stored in a stack. The signature $S[X_{N+1}, S[N]]$ is stored at the first resource.

19 Claims, 4 Drawing Sheets

SYSTEM AND METHOD FOR USING A SECOND RESOURCE TO STORE A DATA ELEMENT FROM A FIRST RESOURCE IN A FIRST-IN LAST-OUT STACK

CROSS-REFERENCE TO RELATED APPLICATIONS

This application claims the benefit of U.S. Provisional Application Ser. No. 60/047,246, filed May 21, 1997.

BACKGROUND OF THE INVENTION

Reliably storing a data element at a resource is an important capability of an information system. A data element is defined to be an item of information. Examples of a data element include an alphanumeric character, a string, an integer, and a floating point number, and any combination thereof. A resource is an apparatus capable of storing a data element.

A resource typically has a finite amount of memory for storing data elements. When the memory of a resource is full, additional data elements cannot be stored at the resource. In this case, the capabilities of the resource can be substantially compromised, and certain data elements that the resource is supposed to store can be lost permanently.

One known system addresses this problem by making available to the first resource a second resource that has memory to spare. For example, a first resource whose memory is full, or about to be full, stores a data element at a second resource. This sharing of memory advantageously distributes the burden of storing data elements across resources.

In one embodiment of this known system, a first resource is connected to a second resource through a network. When the memory space at the first resource becomes limited, the first resource sends a first data element to the second resource through the network, where the first data element is stored. When the first resource later needs the first data element, it sends a request through the network to the second resource. In response, the second resource sends the first data element back to the first resource through the network.

In another embodiment of this known system, a first resource is connected directly to a second resource through an interface. For example, the first resource is a smart card coupled to a second resource, a laptop computer, through a PCMCIA interface. When the memory in the smart card becomes limited, the smart card sends a first data element to the computer through the interface to be stored at the computer. When the smart card needs the first data element again, the smart card sends a request to the computer, and the computer returns the first data element to the smart card.

Although this known system mitigates the problems associated with the limited amount of available memory at a first resource, this known system disadvantageously provides no assurance to the first resource that the data element returned by a second resource is the same as the data element sent earlier from the first resource to the second resource to be stored. In other words, this system provides no assurance to the first resource that the data element retrieved from storage at the second resource has not been modified in some way.

Indeed, it is possible that the data element returned from the second to the first resource may be different from the data element that was sent from the first to the second resource to be stored. To allow for this possibility, the data element sent from the first resource to be stored on the second resource is called the "first data element." The data element received at the first resource ostensibly from the second resource and purported to be the first data element is called the "second data element."

The second data element may not be the same as its corresponding first data element for any of several reasons. For example, the second data element may have been the same as the first data element when it was sent from the second resource to the first resource, but been modified in transit to the first resource. For example, noise may have been injected into the second data element, corrupting it. Alternatively, the second data element may have been modified at a way point (e.g., a router, proxy, etc.) between the second and first resources. On the other hand, the second data element may have been modified (either accidentally or purposefully) at the second resource.

If the second data element is not the same as the first data element, and if the first resource is unable to detect this condition, then disaster can result. For example, suppose the first resource is responsible for computing new account balances for a bank. When the memory of the first resource becomes limited, the first resource stores certain account balances and the interim results of certain calculations at a second resource, also owned by the bank. The first resource receives a second data element that is not the same as its corresponding first data element. For example, the first resource stores a bank balance of $46, 325.00 (the first data element) at the second resource, which the first resource later asks for from the second resource. The second resource returns the value $35.93 (the second data element). Thus, the account balance now stored at the first resource is erroneous, and all subsequent calculations based upon that incorrect account balance will also be erroneous.

There are certain known techniques for protecting the integrity of data that is stored in a possibly untrusted memory resource. See Nancy M. Amato and Michael C. Loui, *Checking Linked Data Structures,* Proceedings of the 24th Annual International Symposium on Fault-Tolerant Computing (FTCS), 1994; and Manual Blum, William Evans, Peter Gemmell, Sampath Kannan and Moni Noar, *Checking the Correctness of Memories,* Algorithmica, 12(⅔, pages 225–244, 1994 (also available in the proceedings of FOCS (Foundations of Computer Science) '91). These techniques address the problem of verifying the correctness of a large memory of size n bits maintained by an all-powerful adversary P (i.e., P has unlimited computer power), subject to update requests originator V that has a limited amount of trusted memory. It has been shown that P can fool V with an incorrect memory whenever V has access to less than log(n) bits of trusted memory. The reference, Manual Blum, William Evans, Peter Gemmell, Sampath Kannan and Moni Noar, *Checking the Correctness of Memories,* Algorithmica, 12(⅔, pages 225–244, 1994 and FOCS '91 Proceedings, also describes implementations of stacks and queues along these lines. The stack implementation uses log(H) memory accesses for operations on a stack of height H.

For practical purposes, it is both unduly expensive and unnecessary to provide for protection against an all-powerful adversary P. It would be more practical to develop a technique that is effective if adversary P is less than all-powerful, but is faster (has more computing power) than the V. It would be further advantageous if, unlike the techniques shown in the prior art, an unlimited amount of data could be stored in untrusted memory in a trusted fashion while using a constant number of bits of trusted memory. Further, the prior art performs a number of memory store and retrieve operations that increases with the amount of data stored on the untrusted resource. A better, more economical system would need to perform only some reasonably-sized fixed number of operations for any amount of data stored in a stack on the untrusted resource, no matter how large.

SUMMARY OF THE INVENTION

In accordance with an embodiment of the present invention, a system and method are provided for using a second resource to store a data element from a first resource in a stack. A data element $X_{N+1}$ and a signature S[N] are signed at a first resource to obtain a signature $S[X_{N+1},S[N]]$, where N is an integer. The data element $X_{N+1}$ and the signature S[N] are sent from the first resource to the second resource to be stored in a stack. The signature $S[X_{N+1},S[N]]$ is stored at the first resource.

The present invention advantageously allows a first resource to store a data element at a second resource that need not be trusted. The present invention enables the first resource to determine if a data element ostensibly received from a stack at the second resource is the same as the data element most recently pushed onto that stack by the first resource. In this way, the first resource can advantageously detect any modification or substitution of a data element that the first resource earlier stored in a stack at a second resource. The present invention provides this capability to the first resource while requiring the first resource to only store a single signature and associated signature verification material (e.g., software, keys, etc.). This advantageously allows a first resource with limited memory resources to use the memory resources of a second resource, even when the second resource may be untrusted.

DETAILED DESCRIPTION

Figure 1:
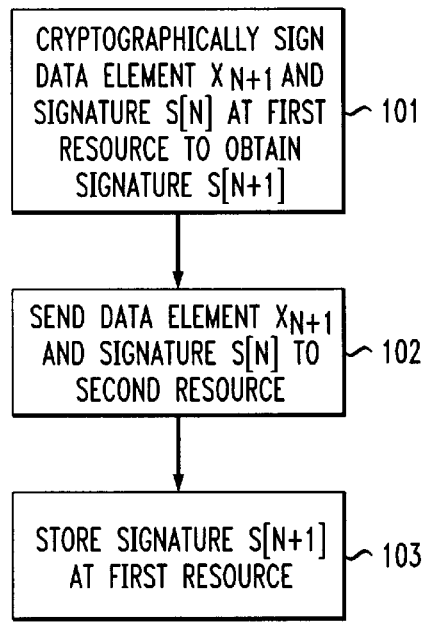
FIG. 1 is a flow chart showing an embodiment of the method for using a second resource to store a data element $X_{N+1}$ from a first resource in a stack at a second resource in accordance with the present invention.

FIG. 1 is a flow chart showing an embodiment of the method for using a second resource to store data element from a first resource in accordance with the present invention. A data element $X_{N+1}$ and a signature S[N] are signed at a first resource to obtain a signature S[N+1], step 101. The data element $X_{N+1}$ and the signature S[N] are sent to the second resource, step 102. The signature S[N+1] is stored at the first resource, step 103.

The terms "signing" and "signature" as used herein refer to the process of treating a first piece of data in such a way as to obtain a second piece of data that is useful in ascertaining that the first piece of data has a certain property. For example, an important property pertaining to the present invention that the technique of cryptographic signing is useful in ascertaining for a first piece of data is whether the first piece of data is the same as a second piece of data. This can be determined using cryptographic signing such as the use of a one-way function (e.g., a hash function), symmetric key authentication codes, asymmetric digital signatures, and other cryptographic techniques that protect data integrity.

An example of a cryptographic system that supports cryptographic signing is symmetric key encryption. In symmetric key encryption, the cryptographic key is kept secret. If a particular key is used to encrypt data, only the same key can decrypt the data.

In one embodiment of the present invention, a first data element and a first signature are signed by a first resource using a symmetric key that the first resource keeps secret. This produces a second signature. In one embodiment, the encrypted version of the first data element and first signature is the second signature. In another embodiment, a signature is produced by generating a message digest from the first data element and first signature, and then encrypting the message digest using the symmetric key. A message digest functions much like a serial number to uniquely identify the data from which it is derived. Here, the encrypted message digest is the signature. The present invention can use any authentication system and is not limited a symmetric key encryption system. For example, the present invention can use a one-time pad system, public key encryption, and so on.

In accordance with one embodiment of the present invention, the first resource advantageously need only store a single signature and any key material necessary to sign data. When a data element A is stored on a stack, data element A is said to be "pushed" onto the stack. When a data element A is retrieved from a stack, data element A is said to be "popped" from the stack. Thus, if data element A is pushed onto a stack, and then data element B is pushed onto the same stack, then data element B will be the first to be popped, and then data element A.

In accordance with an embodiment of the present invention, if the stack is initially empty, then the first data element ("data element A") to be pushed onto the stack at a second resource is signed to obtain signature S(A) at a first resource. A combination of data element A and signature S(A) are then signed at the first resource to obtain another signature, S(A,S(A)). The first resource sends the first data element and the first signature to the second resource, where both are pushed onto a stack. The first resource stores the second signature. Thus, the following configuration obtains:

A (S(A,S(A))

S(A)

Second Resource First Resource

When the first resource stores another data element B at the second resource, the first resource signs data element B and signature S(A,S(A)) to obtain signature S(B,S(A,S(A)). The first resource then sends data element B with the signature S(A(S(A)) to the second resource. The following configuration obtains:

B S(B,S(A,S(A))

S(A,(S(A))

A

S (A)

Second Resource    First resource

Any number of data elements and signatures can be stored at the second resource, up to its capacity, while advantageously only a single data element (a signature) need be stored at the first resource. The advantages of this embodiment of the present invention become especially clear when the first resource pops a data element and signature from the second resource.

When the first resource pops a data element from the second resource in this example, data element Y and signature S are received at the first resource, ostensibly from the second resource.

In order to determine if the data element Y received is the same as the data element B sent most recently from the first resource to the second resource, the first resource now uses its secret key to sign a combination of data element Y and signature S to obtain a signature S'. If S' is the same as the signature S(B,(S(A,S(A)) stored at the first resource, then the first resource is advantageously provided with assurance that the data element Y is the same as the data element B. Further, if S' is the same as S(B,(S(A,S(A)), then S is stored at the first resource, ready to be used to verify if the next data element ostensibly received from the second resource is the same as data element A.

Thus, the present invention allows the first resource to store a theoretically unlimited number of data elements at a second resource while only storing a single signature at the first resource, while providing assurance to the first resource that a data element popped from a second resource stack is the same as the data element that was earlier pushed to the stack from the first resource.

In an embodiment of the present invention, the first resource has already stored at least N data elements on a stack at a second resource, where N is an integer. The first resource stores a signature $S(X_N, S(X_{N-1}, S(X_{N-2}, S( \ldots S(X_1, S(initial)) \ldots ))$, where each $X_i$ is a data element stored at the second resource from the first resource, i being an integer. S(initial) can be a signature of the first data element to be stored on the stack at the second resource, a nonce, or any other suitable initial value. In an embodiment, S(initial) is an identifier that associates a name with the stack.

For brevity, a signature of the form $S(X_N, S(X_{N-1}, S(X_{N-2}, S( \ldots S(X_1, S(initial)) \ldots ))$ will hereinafter be denoted S[N]. Thus, for example, the signature $S(X_{N+1}, S(X_N, S(X_{N-1}, S(X_{N-2}, S( \ldots S(X_1, S(initial)) \ldots ))$ is denoted S[N+1], or equivalently as $S[X_{N+1}, S[N]]$.

In accordance with an embodiment of the present invention, the first resource stores the next data element $X_{N+1}$ at the second resource by first signing a combination of data element $X_{N+1}$ and the signature S[N] presently stored on the first resource to obtain signature S[N+1]. The first resource stores signature S[N+1], and sends data element $X_{N+1}$ and signature S[N] to second resource. Second element $X_{N+1}$ and signature S[N] are pushed onto the stack at the second resource.

Figure 2:
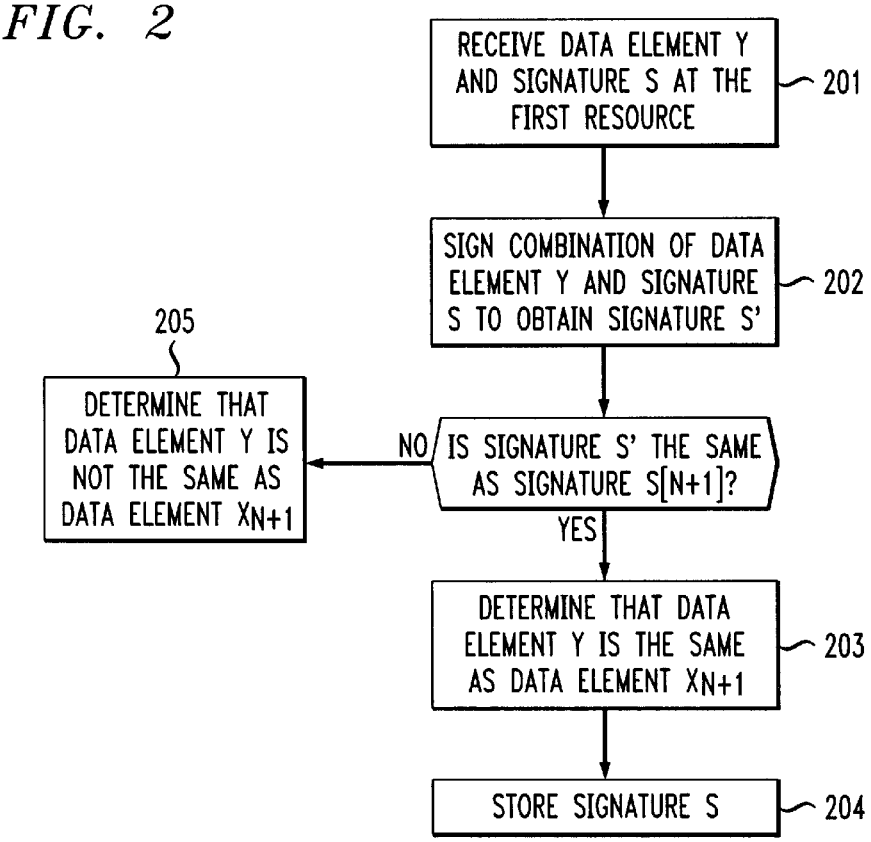
FIG. 2 is a flow chart showing an embodiment of the method for verifying that a second data element received at the first resource is the same as a first data element previously sent from the first resource to the second resource to be stored.

As shown in FIG. 2, in accordance with an embodiment of the present invention, the first resource retrieves a data element Y and a signature S from a second resource, step 201. The first resource expects data element Y to be the same as data element $X_{N+1}$, and it expects S to be S[N]. In accordance with an embodiment of the present invention, the first resource verifies that Y is the same as $X_{N+1}$ using Y, S and the signature presently stored at the first resource, S[N+1]. For example, the first resource signs data element $X_{N+1}$ and signature S to obtain signature S', step 202. If S' is the same as S[N+1], then the first resource determines that Y is the same as the data element $X_{N+1}$, step 203. Also, if S' is the same as S[N+1], then the first resource stores the signature S, step 204. In an embodiment, the first resource uses signature S in accordance with the present invention to determine if the next data element ostensibly received from the second resource (along with another signature) is the same as data element $X_N$.

If S' is not the same as S[N+1], then the first resource determines that Y is not the same as the data element $X_{N+1}$, step 205.

Figure 3:
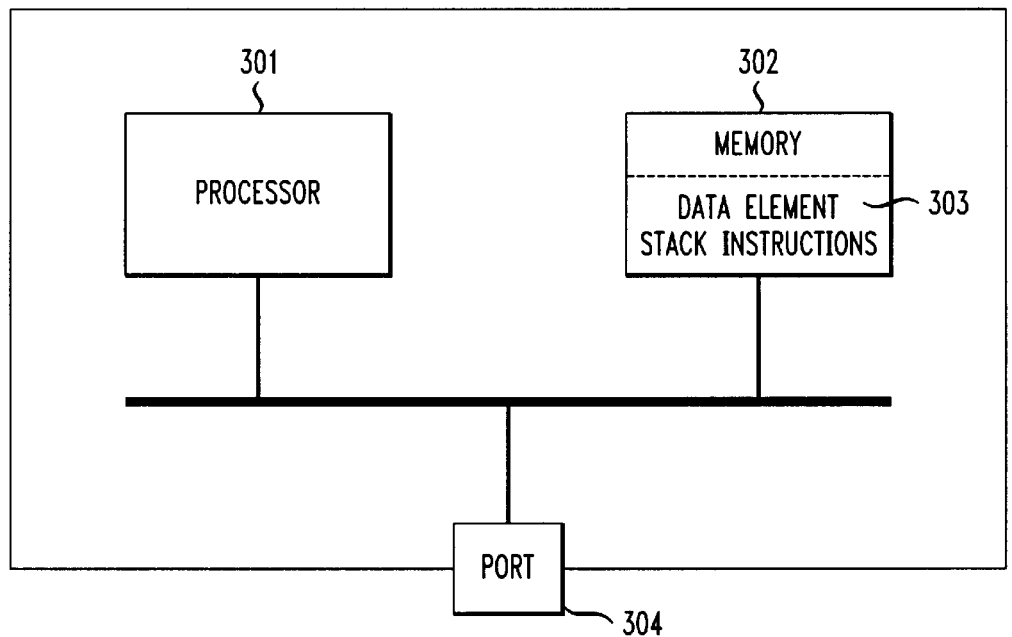
FIG. 3 illustrates an embodiment of an apparatus in accordance with the present invention.

FIG. 3 shows an embodiment of an apparatus in accordance with the present invention. The apparatus comprises a processor 301 and a memory 302 that stores data element stack instructions 303. Data element stack instructions 303 are adapted to be executed on processor 301 to sign a data element $X_{N+1}$ and a signature S[N] to obtain a signature $S[X_{N+1}, S[N]]$, where N is an integer, send the data element $X_{N+1}$ and the signature S[N] to another resource, and store the signature $S[X_{N+1}, S[N]]$ at memory 302. The apparatus further comprises a port 304 adapted to be coupled to another resource. In an embodiment, port 304 is adapted to be coupled to another resource through a PCMCIA interface. In an embodiment, port 304 is adapted to be coupled to another resource through a network. Port 304 and memory 302 are coupled to processor 301.

In an embodiment, memory 302 is Random Access Memory (RAM). In an embodiment, memory 302 is a hard disk drive. In an embodiment, memory 302 is a combination of RAM and a hard disk drive.

Figure 4:
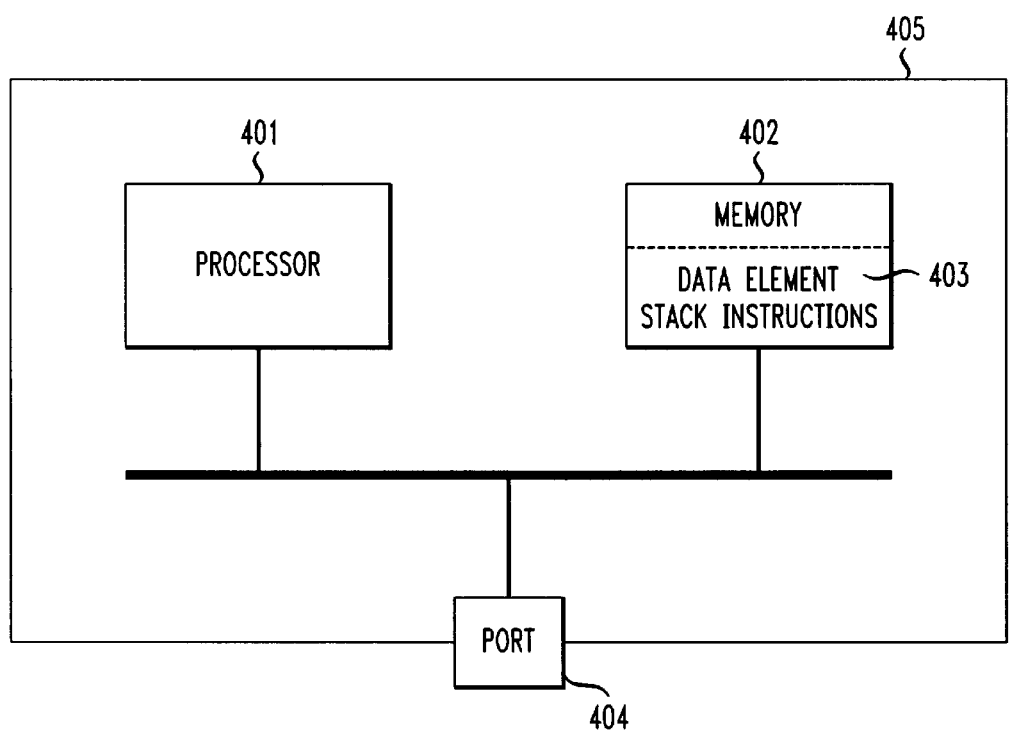
FIG. 4 illustrates an embodiment of an apparatus in accordance with the present invention that includes a tamper-proof enclosure.

FIG. 4 shows another embodiment of the apparatus in accordance with the present invention. In this embodiment, the apparatus comprises a processor 401 and memory 402 that stores data element stack instructions 403 adapted to be executed by processor 401 to sign a data element $X_{N+1}$ and a signature S [N] to obtain a signature $S[X_{N+1}, S[N]]$, where N is an integer, send the data element $X_{N+1}$ and the signature S[N] to another resource, and store the signature $S[X_{N+1}, S[N]]$ at memory 402. The apparatus further comprises a tamper-proof enclosure surrounding processor 401 and memory 402. Port 404 is an electrical interface disposed to conduct electrical signals through said tamper-proof enclosure 405. Port 405 is coupled to processor 401 and memory 402.

Figure 5:
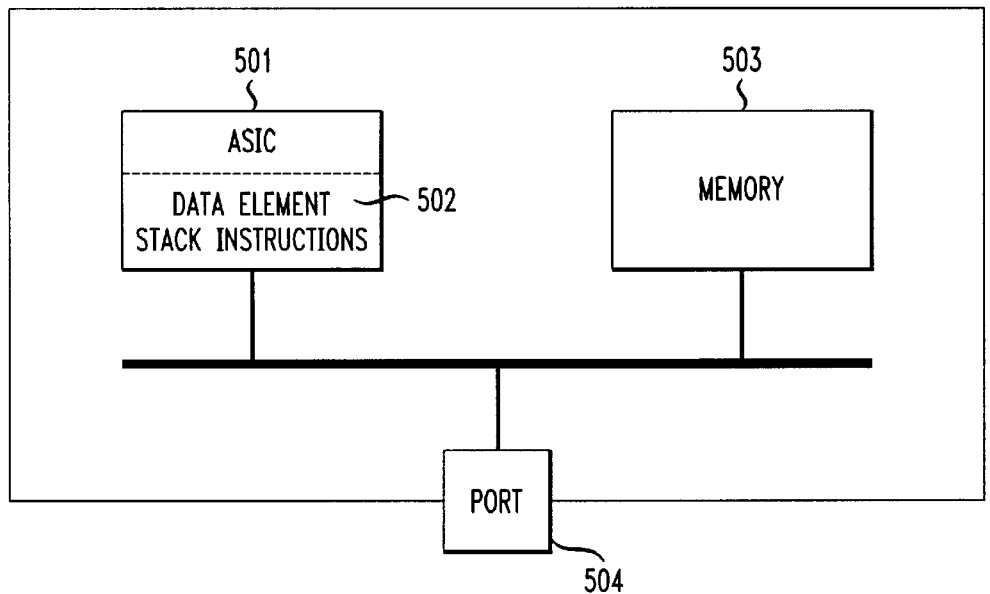
FIG. 5 illustrates an embodiment of the apparatus in accordance with the present invention that includes an application specific integrated circuit.

FIG. 5 shows yet another embodiment of the apparatus in accordance with the present invention. The apparatus comprises an application specific integrated circuit (ASIC) 501. ASIC 501 embodies data element stack instructions 502 adapted to be executed by ASIC 501 sign a data element $X_{N+1}$ and a signature S[N] to obtain a signature $S[X_{N+1}, S[N]]$, where N is an integer, send the data element $X_{N+1}$ and the signature S[N] to another resource, and store the signature $S[X_{N+1}, S[N]]$ at memory 503. The apparatus further comprises port 504 adapted to be coupled to another resource. Memory 503 and port 504 are coupled to ASIC 501.

Figure 6:
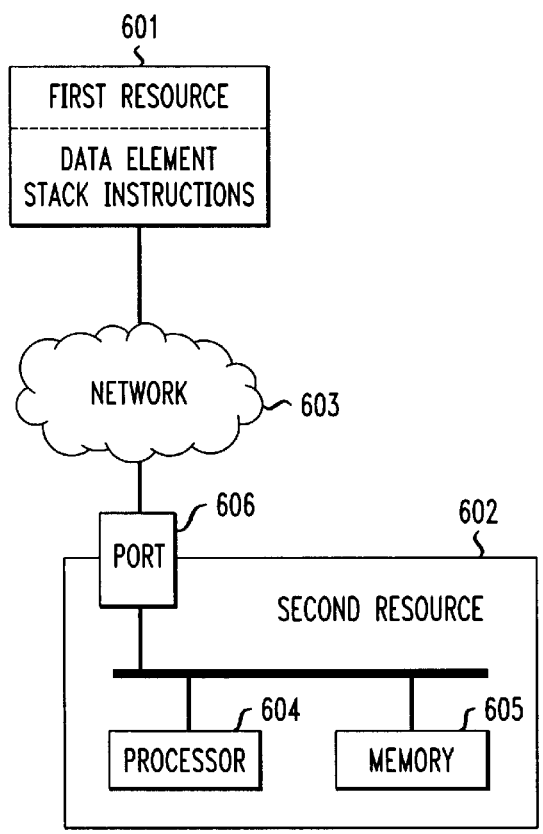
FIG. 6 illustrates a system level embodiment of the present invention where the first resource and second resource communicate through a network.

System level embodiment of the present invention is shown in FIG. 6. First resource 601 uses second resource 602 to store a data element. Data elements and signatures are sent from and received at first resource 601 to and from second resource 602 through network 603. In accordance with the present invention, network 603 can be connection-oriented, connectionless, circuit switched, packet switched, or any combination thereof, or an internetwork of networks. In accordance with the present invention, second resource 602 comprises a processor 604, a memory 605 adapted to store a data element and a signature, and a port 606. Port 606 and memory 605 are coupled to processor 604.

Figure 7:
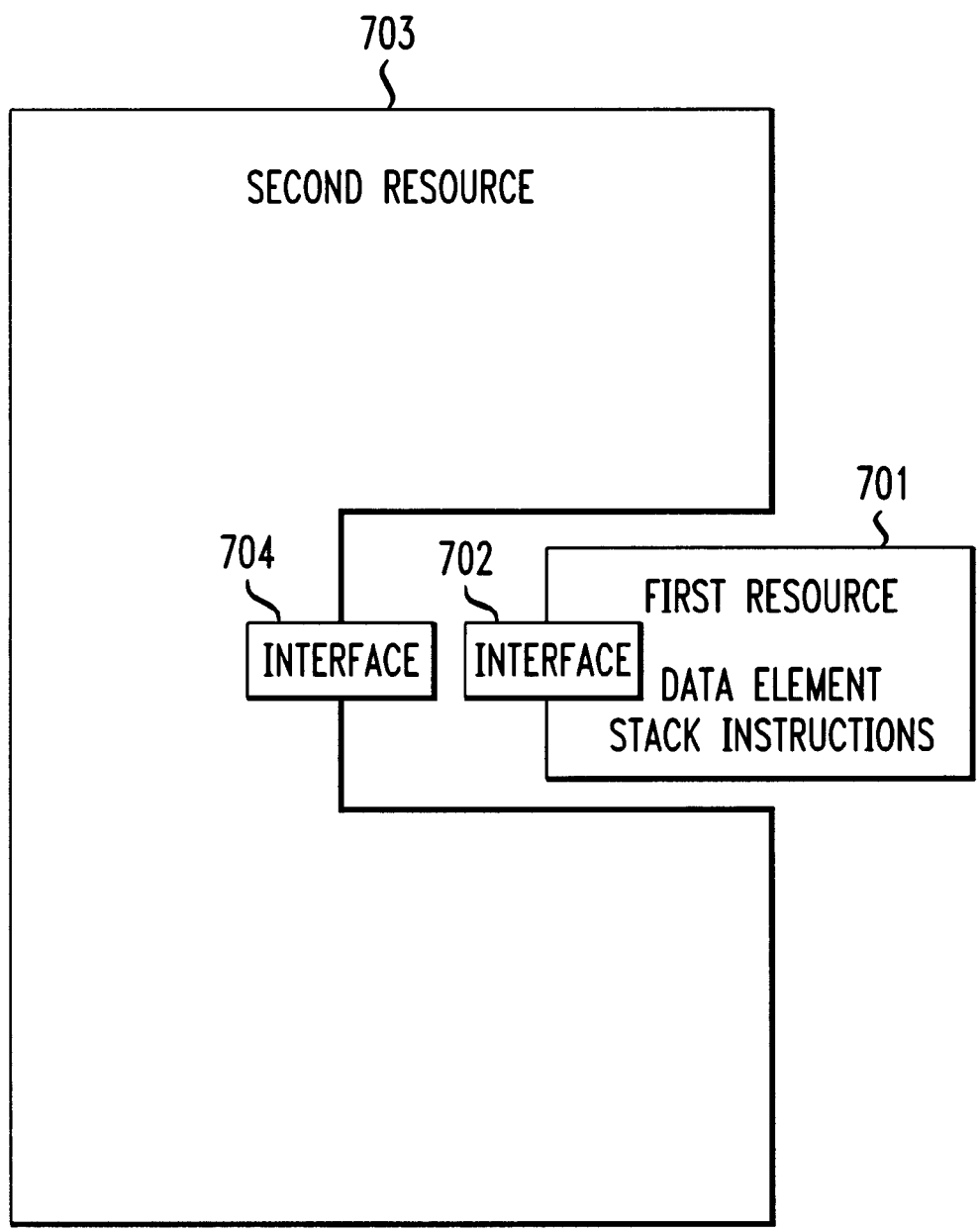
FIG. 7 illustrates a system level embodiment of the present invention wherein the first resource and the second resource communicate with each other through their respective interfaces.

FIG. 7 shows another system level embodiment of the present invention. In this embodiment, the first resource 701 is a smart card with a first resource interface 702. Second resource 703 has a second resource interface 704. The first resource interface 702 is adapted to communicate with second resource interface 704. One embodiment of the present invention, second resource 703 is a laptop computer and first resource 701 is a smart card coupled to the computer through a PCMCIA interface.

The present invention advantageously allows a first resource to store data element on a second resource which the first resource need not trust. The present invention advantageously allows a first resource to use a second resource to store a data element such that when the data element is returned to the first resource, the first resource can ascertain whether the data element received from the second resource is the same as the data element earlier sent from the first resource to be stored at the second resource. In accordance with the present invention, a first resource with limited memory can advantageously use a second resource that need not be trusted by the first resource to store a data element in a trusted fashion.

Although several embodiments of the present invention are specifically illustrated and described herein, modifications and variations of the present invention are covered by the above teachings and within the purview of the appended claims without departing from the spirit and intended scope of the invention.

What is claimed is:

1. A method for using a second resource to store a data element from a first resource in a stack, comprising the steps of:
    a. signing a data element $X_{N+1}$ and a signature $S[N]=S(X_N,S(X_{N-1},S(X_{N-2},S(\ldots S(X_1,S(initial))\ldots))$ at a first resource to obtain a signature $S[X_{N+1},S[N]]$, where N is an integer and S(initial) is any arbitrary initial value;
    b. sending the data element $X_{N+1}$ and the signature $S[N]$ from the first resource to the second resource to be stored at the second resource; and
    c. storing the signature $S[X_{N+1},S[N]]$ at the first resource.
2. The method of claim 1, further comprising the steps of:
    d. receiving a data element Y and a signature S at the first resource;
    e. signing a combination of the data element Y and the signature S to obtain a signature S'; and
    f. determining if the signature S' is the same as the signature $S[X_{N+1},S[N]]$.
3. The method of claim 1, further comprising the steps of:
    d. receiving a data element Y and a signature S at the first resource;
    e. signing the data element Y and the signature S to obtain a signature S';
    f. determining if the signature S' is the same as the signature $S[X_{N+1},S[N]]$; and
    g. if the signature S' is the same as the signature $S[X_{N+1},S[N]]$, then determining that the data element Y is the same as the data element $X_{N+1}$.
4. The method of claim 1, further comprising the steps of:
    d. receiving a data element Y and a signature S at the first resource;
    e. signing the data element Y and the signature S to obtain a signature S';
    f. determining if the signature S' is the same as the signature $S[X_{N+1},S[N]]$; and
    g. if the signature S' is the same as the signature $S[X_{N+1},S[N]]$, then:
        i. determining that the data element Y is the same as the data element $X_{N+1}$; and
        ii. storing the signature S at the first resource.
5. A method for using a second resource to store a data element from a first resource in a stack, comprising the steps of:
    a. receiving a data element $X_{N+1}$ and a signature $S[N]=S(X_N,S(X_{N-1},S(X_{N-2},S(\ldots S(X_1,S(initial))\ldots))$ from the first resource at the second resource where S(initial) is any arbitrary initial value; and
    b. storing the data element $X_{N+1}$ and a signature $S[N]$ in a stack at the second resource.
6. The method of claim 5, further comprising the steps of:
    c. receiving a request for a data element from the first resource at the second resource; and
    d. sending a data element $X_{N+1}$ and a signature $S[N]$ from the second resource to the first resource.
7. An apparatus for storing a data element at a second resource, comprising:
    a. a processor;
    b. a memory that stores instructions adapted to be executed by said processor to sign a data element $X_{N+1}$ and a signature $S[N]=S(X_N,S(X_{N-1},S(X_{N-2},S(\ldots S(X_1,S(initial))\ldots))$ to obtain a signature $S[X_{N+1},S[N]]$, where N is an integer and S(initial) is any arbitrary initial value, send the data element $X_{N+1}$ and the signature $S[N]$ to the second resource, and store the signature $S[X_{N+1},S[N]]$ in a stack in said memory; and
    c. a port adapted to be coupled to the second resource and through which the data element $X_{N+1}$ and signature $S[N]$ are sent to the second resource, said port and said memory coupled to said processor.
8. The apparatus of claim 7, wherein said instructions are further adapted to be executed by said processor to receive a data element Y and a signature S, sign a combination of the data element Y and the signature S to obtain a signature S', and determine if the signature S' is the same as the signature $S[X_{N+1},S[N]]$.
9. The apparatus of claim 7, further comprising a tamper-proof enclosure surrounding said processor and memory, and wherein said port comprises an electrical interface disposed to conduct electrical signals through said tamper-proof enclosure to said processor.
10. The apparatus of claim 7, wherein said port is adapted to be coupled to the second resource through a network.
11. The apparatus of claim 7, wherein said port is adapted to be coupled to the second resource through a PCMCIA interface.
12. A medium that stores instructions adapted to be executed by a processor to perform the steps of:
    a. signing a data element $X_{N+1}$ and a signature $S[N]=S(X_N,S(X_{N-1},S(X_{N-2},S(\ldots S(X_1,S(initial))\ldots))$ at a first resource to obtain a signature $S[X_{N+1},S[N]]$, where N is an integer and S(initial) is any arbitrary initial value;
    b. sending the data element $X_{N+1}$ and the signature $S[N]$ from the first resource to the second resource to be stored in a stack at the second resource; and
    c. storing the signature $S[X_{N+1},S[N]]$ at the first resource.
13. The medium of claim 12, wherein said instructions are further adapted to be executed by a processor to perform the steps of:
    d. receiving a data element Y and a signature S at the first resource;

e. signing a combination of the data element Y and the signature S to obtain a signature S'; and f. determining if the signature S' is the same as the signature $S[X_{N+1},S[N]]$.

14. The medium of claim 12, wherein said instructions are further adapted to be executed by a processor to perform the steps of:

d. receiving a data element Y and a signature S at the first resource;

e. signing the data element Y and the signature S to obtain a signature S';

f. determining if the signature S' is the same as the signature $S[X_{N+1},S[N]]$; and g. if the signature S' is the same as the signature $S[X_{N+1},S[N]]$, then determining that the data element Y is the same as the data element $X_{N+1}$.

15. The medium of claim 12, wherein said instructions are further adapted to be executed by a processor to perform the steps of:

d. receiving a data element Y and a signature S at the first resource;

e. signing the data element Y and the signature S to obtain a signature S';

f. determining if the signature S' is the same as the signature $S[X_{N+1},S[N]]$; and g. if the signature S' is the same as the signature $S[X_{N+1},S[N]]$, then:

i. determining that the data element Y is the same as the data element $X_{N+1}$; and ii. storing the signature S at the first resource.

16. A system for storing a data element from a first resource at a second resource in a stack, comprising:

a. means for signing a data element $X_{N+1}$ and a signature $S[N]=S(X_N,S(X_{N-1},S(X_{N-2},S(\ldots S(X_1,S(initial))\ldots)$ at a first resource to obtain a signature $S[X_{N+1},S[N]]$, where N is an integer and S(initial) is any arbitrary initial value;

b. means for sending the data element $X_{N+1}$ and the signature S[N] from the first resource to the second resource to be stored in a stack at the second resource; and c. means for storing the signature $S[X_{N+1},S[N]]$ at the first resource.

17. The system of claim 16, further comprising:

d. means for receiving a data element Y and a signature S at the first resource;

e. means for signing a combination of the data element Y and the signature S to obtain a signature S'; and f. means for determining if the signature S' is the same as the signature $S[X_{N+1},S[N]]$.

18. The system of claim 16, further comprising:

d. means for receiving a data element Y and a signature S at the first resource;

e. means for signing the data element Y and the signature S to obtain a signature S';

f. means for determining if the signature S' is the same as the signature $S[X_{N+1},S[N]]$; and g. means for determining that the data element Y is the same as the data element $X_{N+1}$.

19. The system of claim 16, further comprising:

d. means for receiving a data element Y and a signature S at the first resource;

e. means for signing the data element Y and the signature S to obtain a signature S';

f. means for determining if the signature S' is the same as the signature $S[X_{N+1},S[N]]$;

g. means for determining that the data element Y is the same as the data element $X_{N+1}$; and h. means for storing signature S.

* * * * *